US012615555B2

(12) United States Patent (10) Patent No.: US 12,615,555 B2
Xu et al. (45) Date of Patent: Apr. 28, 2026

(54) METHOD AND APPARATUS FOR PERFORMING QOE MANAGEMENT BASED ON AI MODEL IN A WIRELESS COMMUNICATION SYSTEM

(71) Applicant: LG Electronics Inc., Seoul (KR)

(72) Inventors: Jian Xu, Seoul (KR); Daewook Byun, Seoul (KR); Seokjung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 103 days.

(21) Appl. No.: 18/565,995

(22) PCT Filed: Jan. 17, 2022

(86) PCT No.: PCT/KR2022/000800
§ 371 (c)(1),
(2) Date: Nov. 30, 2023

(87) PCT Pub. No.: WO2023/282421
PCT Pub. Date: Jan. 12, 2023

(65) Prior Publication Data
US 2024/0364605 A1 Oct. 31, 2024

(30) Foreign Application Priority Data
Jul. 9, 2021 (KR) ........................ 10-2021-0090480

(51) Int. Cl.
*H04W 24/08* (2009.01)
*H04L 12/12* (2006.01)
(Continued)

(52) U.S. Cl.
CPC ............. *H04W 28/24* (2013.01); *H04L 12/12* (2013.01); *H04L 41/16* (2013.01);
(Continued)

(58) Field of Classification Search
CPC . H04W 28/24; H04W 36/0044; H04W 76/27; H04W 24/02; H04W 76/16;
(Continued)

(56) References Cited

U.S. PATENT DOCUMENTS

| | | | |
|---|---|---|---|
| 2013/0268577 A1 * | 10/2013 | Oyman | ................... H04L 51/58 |
| | | | 709/203 |
| 2020/0413316 A1 | 12/2020 | Isaksson et al. | |
| 2022/0046503 A1 * | 2/2022 | Kumar | .................. H04W 28/24 |

FOREIGN PATENT DOCUMENTS

| | | | |
|---|---|---|---|
| BR | 102020014072 A2 * | 2/2021 | ............... G06N 7/01 |
| WO | WO-2005022852 A1 * | 3/2005 | ......... H04L 41/5009 |

(Continued)

OTHER PUBLICATIONS

3GPP, "3rd Generation Partnership Project; Technical Specification Group RAN; Evolved Universal Terrestrial Radio Access (E-UTRA) and NR; Study on enhancement for Data Collection for NR and EN-DC (Release 17)," 3GPP TR 37.817 V0.1.0, Jan. 2021, 8 pages.

(Continued)

*Primary Examiner* — Kyung H Shin
(74) *Attorney, Agent, or Firm* — Fish & Richardson P.C.

(57) ABSTRACT

A method and apparatus for performing QoE management based on AI model in a wireless communication system is provided. A RAN node transmits a Quality of Experience (QoE) configuration including one or more of QoE parameters. A RAN node receives a QoE report for the one or more of QoE parameters. A RAN node trains an AI model using the one or more QoE parameters as inputs.

8 Claims, 11 Drawing Sheets

(51) Int. Cl.

| | |
|---|---|
| *H04L 41/16* | (2022.01) |
| *H04L 41/5067* | (2022.01) |
| *H04L 51/58* | (2022.01) |
| *H04W 28/24* | (2009.01) |
| *H04W 36/24* | (2009.01) |

(52) U.S. Cl.
CPC .......... *H04L 41/5067* (2013.01); *H04L 51/58* (2022.05); *H04W 24/08* (2013.01); *H04W 36/247* (2023.05)

(58) Field of Classification Search
CPC .......... H04W 4/50; H04L 12/12; H04L 41/16; H04L 41/14; H04L 41/5067; H04L 41/5009; H04L 41/5006; H04L 65/80; H04L 51/58; H04L 65/756; H04L 65/70; H04L 5/0051; H04L 65/1016; H04N 21/2353; H04N 21/25825; H04N 21/44209; H04N 21/6131; H04N 13/00; H04N 21/4424; H04N 21/6125; H04N 21/643; G06N 7/01; G06N 3/006; G06N 20/00; E02F 9/265; E02F 3/43; E02F 9/2025; G05B 13/02
See application file for complete search history.

(56) References Cited

FOREIGN PATENT DOCUMENTS

| | | | |
|---|---|---|---|
| WO | 2016/072893 A1 | 5/2016 | |
| WO | WO-2022226713 A1 * | 11/2022 | ............. H04L 12/12 |

OTHER PUBLICATIONS

Extended European Search Report in European Appln. No. 22837776.8, mailed on Apr. 2, 2025, 13 pages.
Huawei, China Unicom, "Discussions on potential RAN3 impacts about the QoE measurement configuration, reporting and releasing under SA, NSA and MR-DC operation," R3-206734, 3GPP TSG-RAN WG3 Meeting #110-e, France, Nov. 2-12, 2020, 7 pages.

* cited by examiner

Figure 3:
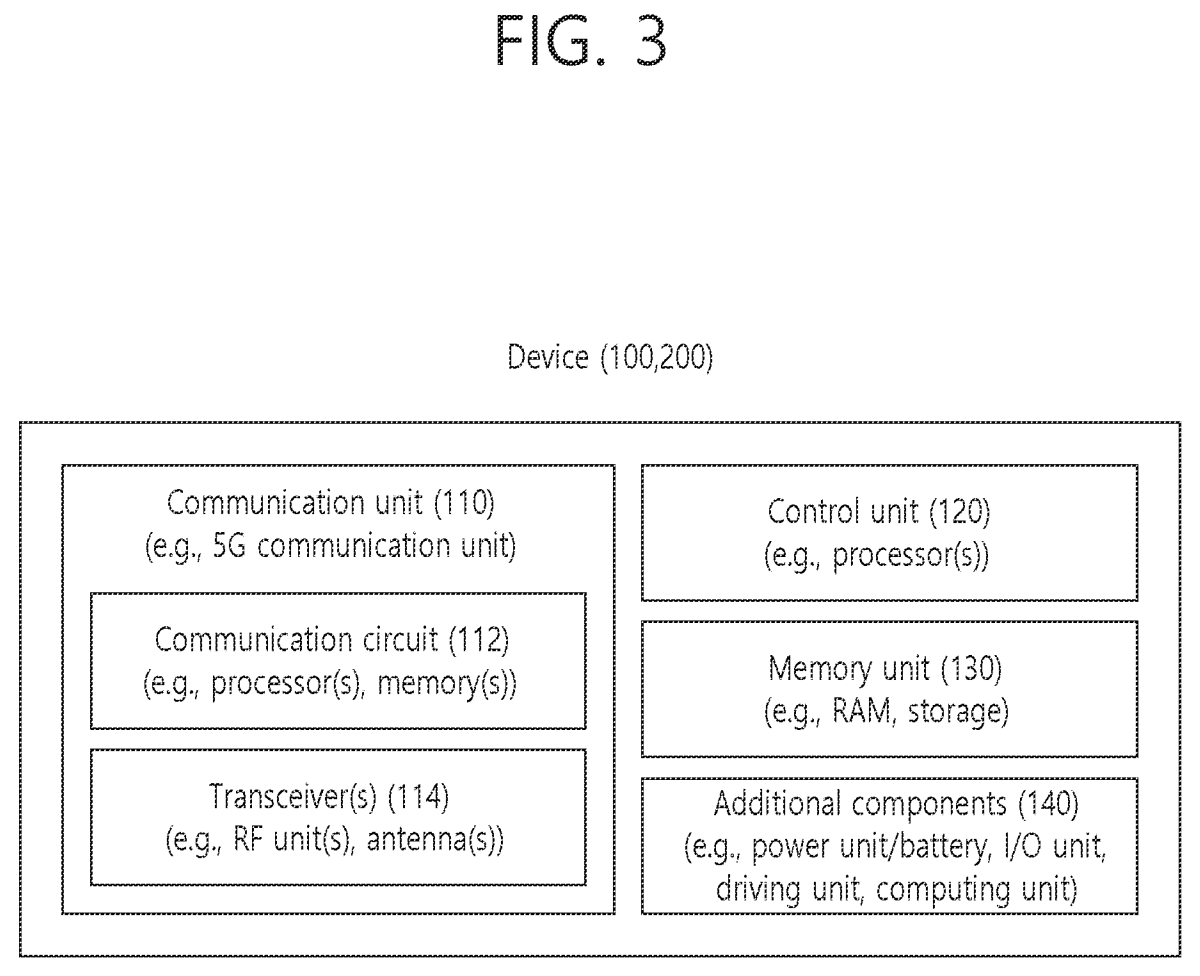

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

FIG. 10

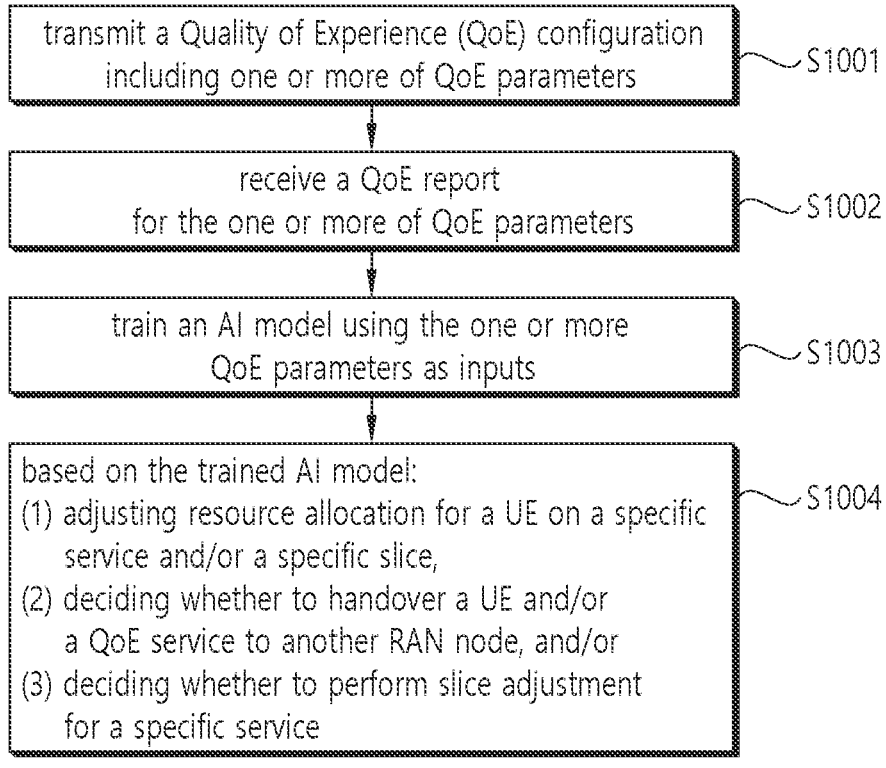

transmit a Quality of Experience (QoE) configuration
including one or more of QoE parameters     ~S1001 receive a QoE report
for the one or more of QoE parameters     ~S1002 train an AI model using the one or more
QoE parameters as inputs     ~S1003 based on the trained AI model:
(1) adjusting resource allocation for a UE on a specific
     service and/or a specific slice,
(2) deciding whether to handover a UE and/or
     a QoE service to another RAN node, and/or
(3) deciding whether to perform slice adjustment
     for a specific service     ~S1004

METHOD AND APPARATUS FOR PERFORMING QOE MANAGEMENT BASED ON AI MODEL IN A WIRELESS COMMUNICATION SYSTEM

CROSS-REFERENCE TO RELATED APPLICATIONS

This application is a National Stage application under 35 U.S.C. § 371 of International Application No. PCT/KR2022/000800, filed on Jan. 17, 2022, which claims the benefit of Korean Patent Application No. 10-2021-0090480, filed on Jul. 9, 2021. The disclosures of the prior applications are incorporated by reference in their entirety.

TECHNICAL FIELD

The present disclosure relates to a method and apparatus for performing QoE management based on AI model in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

Artificial Intelligence (AI) including machine learning (ML) algorithms provides a powerful tool to help operators to improve the network management and the user experience, by analyzing the data collected and autonomously processed that can yield further insights. Application of AI in 5G network has gained tremendous attention in both academia and industry.

Meanwhile, in 5G network, RAN node needs to support adaptive QoE management mechanism for the various services. Conventional solution for RAN node is to check that some services can be fulfilled or not based on the limited RAN aware parameters. However, this may not be good for the whole system. For example, the current situation may not apply for the future.

Therefore, studies for performing QoE management based on AI model in a wireless communication system are needed.

In an aspect, a method performed by a Random Access Network (RAN) node in a wireless communication system is provided. A RAN node transmits a Quality of Experience (QoE) configuration including one or more of QoE parameters. A RAN node receives a QoE report for the one or more of QoE parameters. A RAN node trains an AI model using the one or more QoE parameters as inputs. Based on the trained AI model, a RAN node (1) adjusts resource allocation for a UE on a specific service and/or a specific slice, (2) decides whether to handover or offload a UE and/or a QoE service to another RAN node, and/or (3) decides whether to perform slice adjustment for a specific service.

In another aspect, an apparatus for implementing the above method is provided.

The present disclosure may have various advantageous effects.

According to some embodiments of the present disclosure, a RAN node could perform QoE management efficiently by using an AI function.

For example, a RAN node could predicate the situation in the future and make a decision for UE(s) on a better resource allocation solution for a specific service.

For example, a RAN node could predicate the situation in the future. Thus, a RAN node could make a decision for UE(s) on a better resource allocation solution for a specific service, handover/offloading a specific service/UE to other node. In addition, a RAN node could perform slice based adjustment.

According to some embodiments of the present disclosure, the QoE of a UE could be enhanced from RAN point of view.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 1 shows an example of a communication system to which implementations of the present disclosure is applied.

FIG. 2 shows an example of wireless devices to which implementations of the present disclosure is applied.

FIG. 3 shows an example of a wireless device to which implementations of the present disclosure is applied.

FIG. 10 shows an example of a method for performing QoE management based on AI model in a wireless communication system, according to some embodiments of the present disclosure.

DETAILED DESCRIPTION

Figure 4:
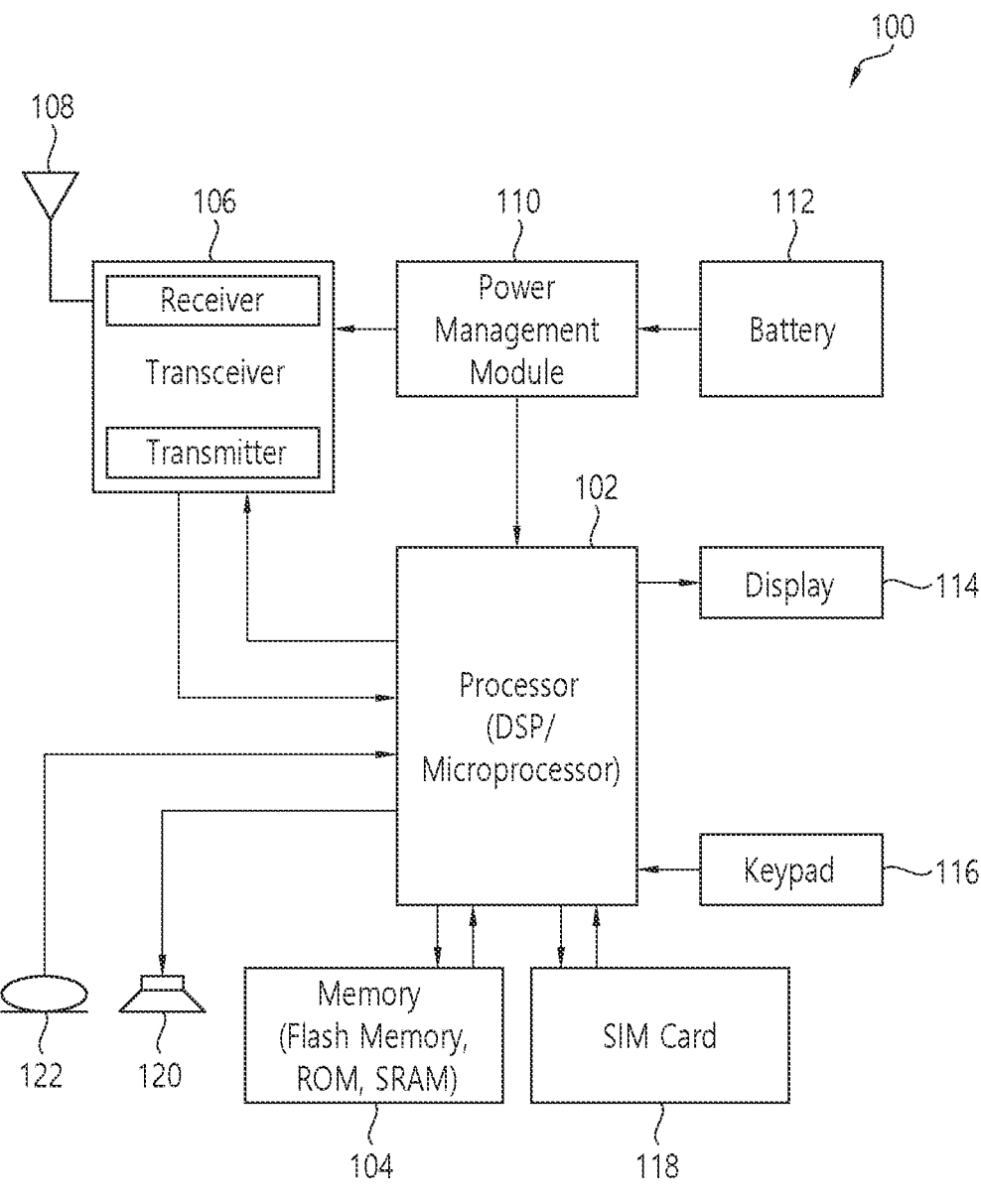
FIG. 4 shows an example of UE to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 1:
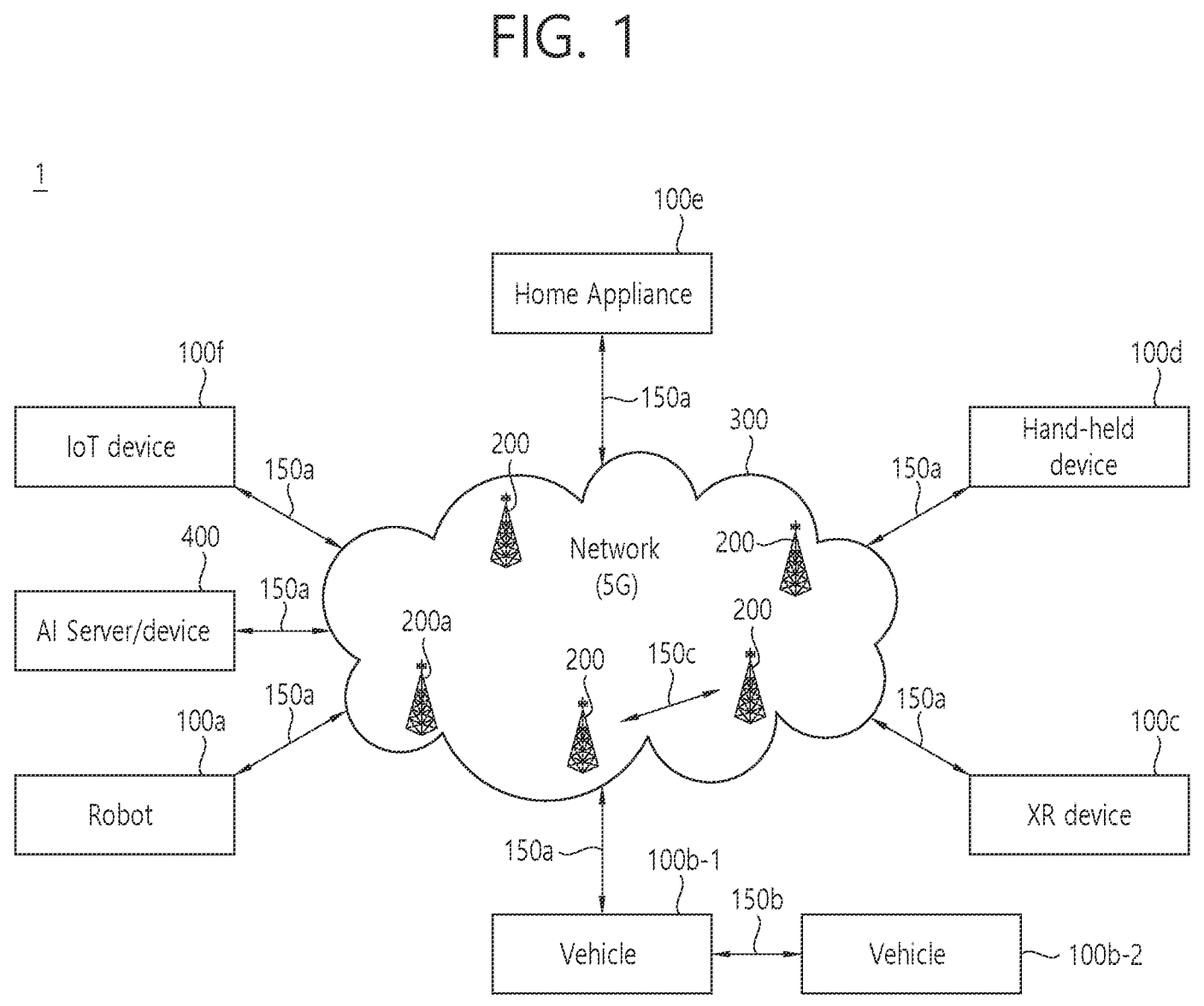

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 KHz, wide area can be supported in traditional cellular bands, and if SCS is 30 KHz/60 KHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
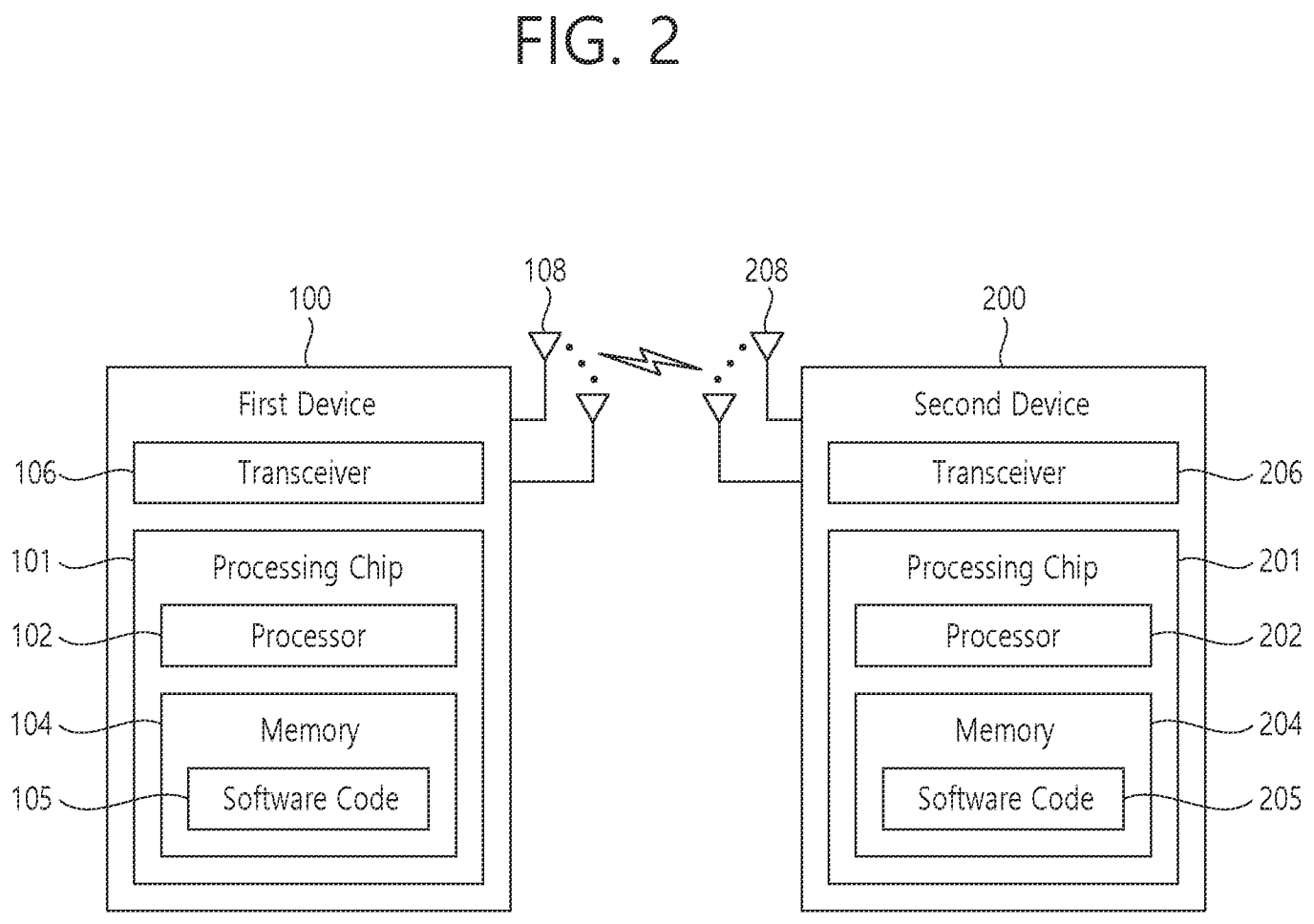

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
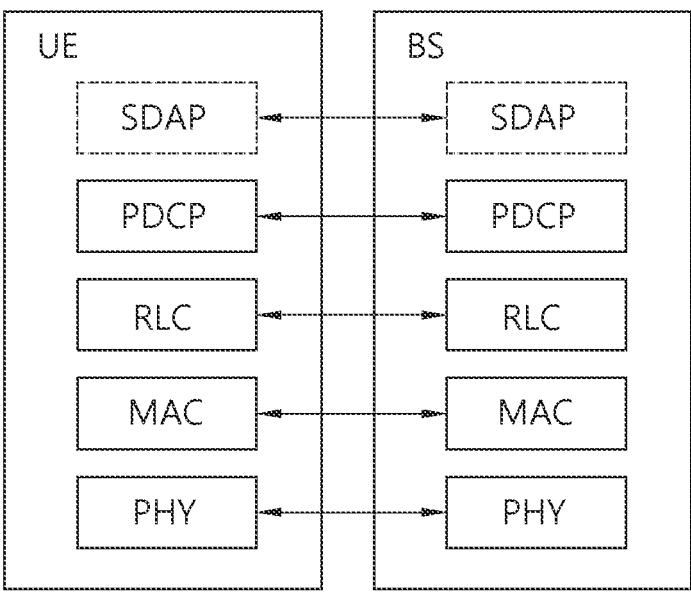
FIGS. 5 and 6 show an example of protocol stacks in a 3GPP based wireless communication system to which implementations of the present disclosure is applied.
Figure 6:
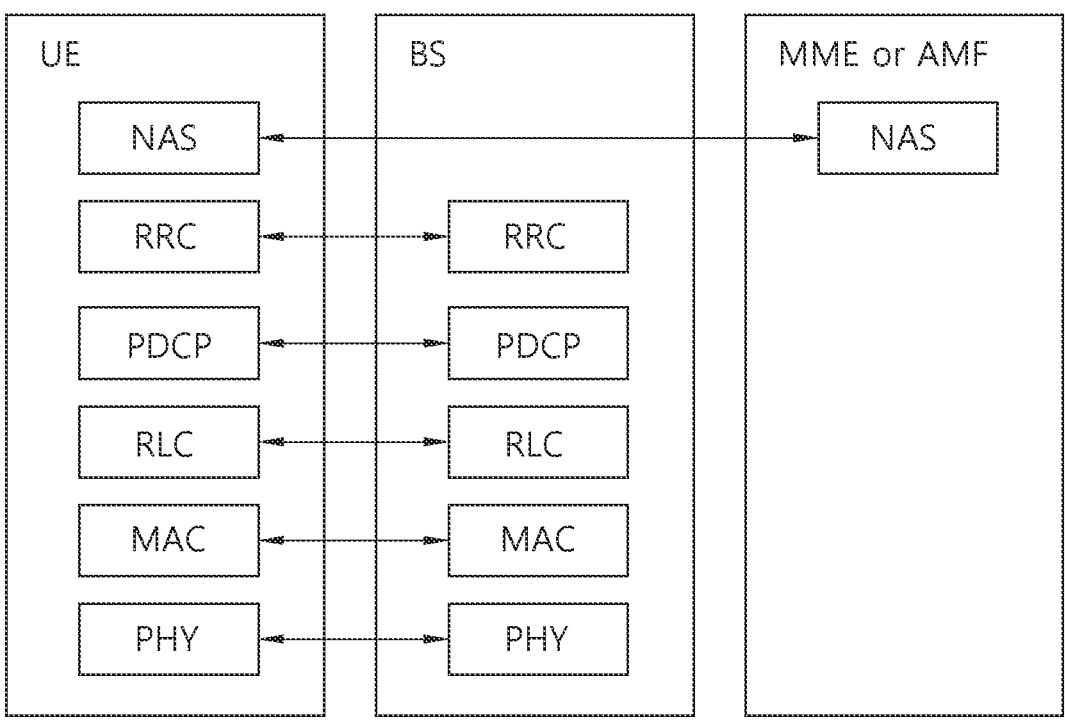

FIGS. 5 and 6 show an example of protocol stacks in a 3GPP based wireless communication system to which implementations of the present disclosure is applied.

In particular, FIG. 5 illustrates an example of a radio interface user plane protocol stack between a UE and a BS and FIG. 6 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 5, the user plane protocol stack may be divided into Layer 1 (i.e., a PHY layer) and Layer 2. Referring to FIG. 6, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information.

Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH). BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system informa-tion related to AS and NAS; paging initiated by 5GC or NG-RAN; establishment, maintenance and release of an RRC connection between the UE and NG-RAN; security functions including key management; establishment, con-figuration, maintenance and release of signaling radio bear-ers (SRBs) and data radio bearers (DRBs); mobility func-tions (including: handover and context transfer, UE cell selection and reselection and control of cell selection and reselection, inter-RAT mobility); QOS management func-tions; UE measurement reporting and control of the report-ing; detection of and recovery from radio link failure; NAS message transfer to/from NAS from/to UE.

Figure 7:
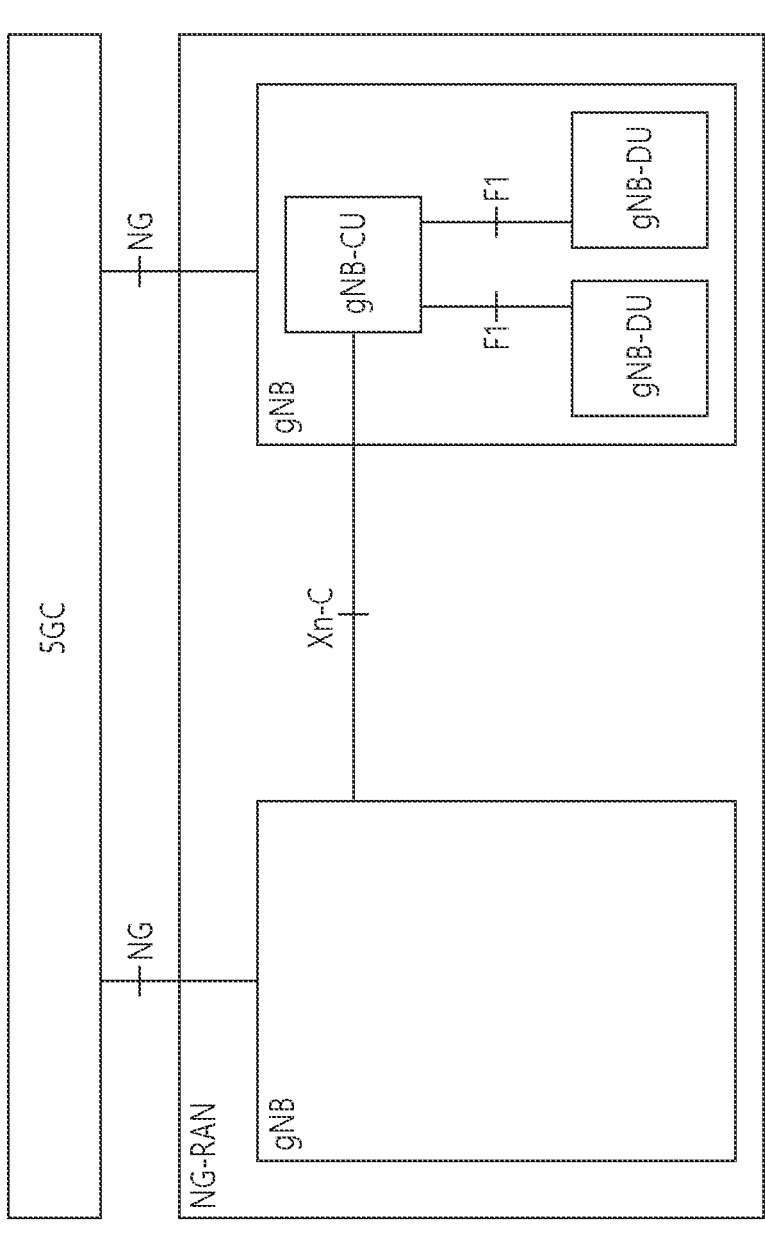
FIG. 7 shows an example of the overall architecture of an NG-RAN to which technical features of the present disclosure can be applied.

FIG. 7 shows an example of the overall architecture of an NG-RAN to which technical features of the present disclo-sure can be applied.

Referring to FIG. 7, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is sup-ported by only one gNB-DU.

The gNB-CU and gNB-DU are connected via an F1 interface. The gNB-CU terminates the F1 interface con-nected to the gNB-DU. The gNB-DU terminates the F1 interface connected to the gNB-CU. One gNB-DU is con-nected to only one gNB-CU. However, the gNB-DU may be connected to multiple gNB-CUs by appropriate implemen-tation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Figure 8:
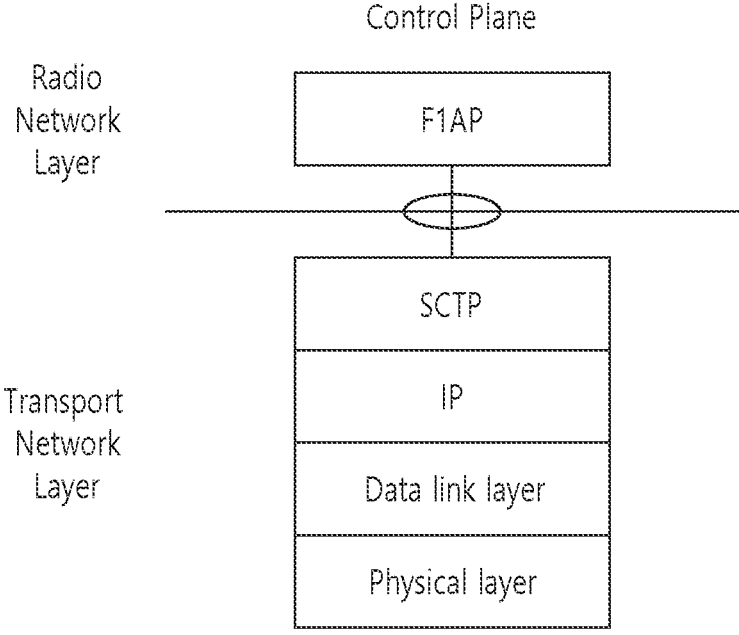
FIG. 8 shows an interface protocol structure for F1-C to which technical features of the present disclosure can be applied.

FIG. 8 shows an interface protocol structure for F1-C to which technical features of the present disclosure can be applied.

A transport network layer (TNL) is based on Internet protocol (IP) transport, comprising a stream control trans-mission protocol (SCTP) layer on top of the IP layer. An application layer signaling protocol is referred to as an F1 application protocol (E1AP).

Hereinafter, terms for the present disclosure are described. Section 3.1 of 3GPP TS 37.817 v0.1.0 may be referred.

Data collection: Data collected from the network nodes, management entity or UE, as a basis for ML model training, data analytics and inference.

ML Model: A data driven algorithm by applying machine learning techniques that generates a set of outputs consisting of predicted information, based on a set of inputs ML Training: An online or offline process to train an ML model by learning features and patterns that best present data and get the trained ML model for inference.

ML Inference: A process of using a trained ML model to make a prediction or guide the decision based on collected data and ML model.

Figure 9:
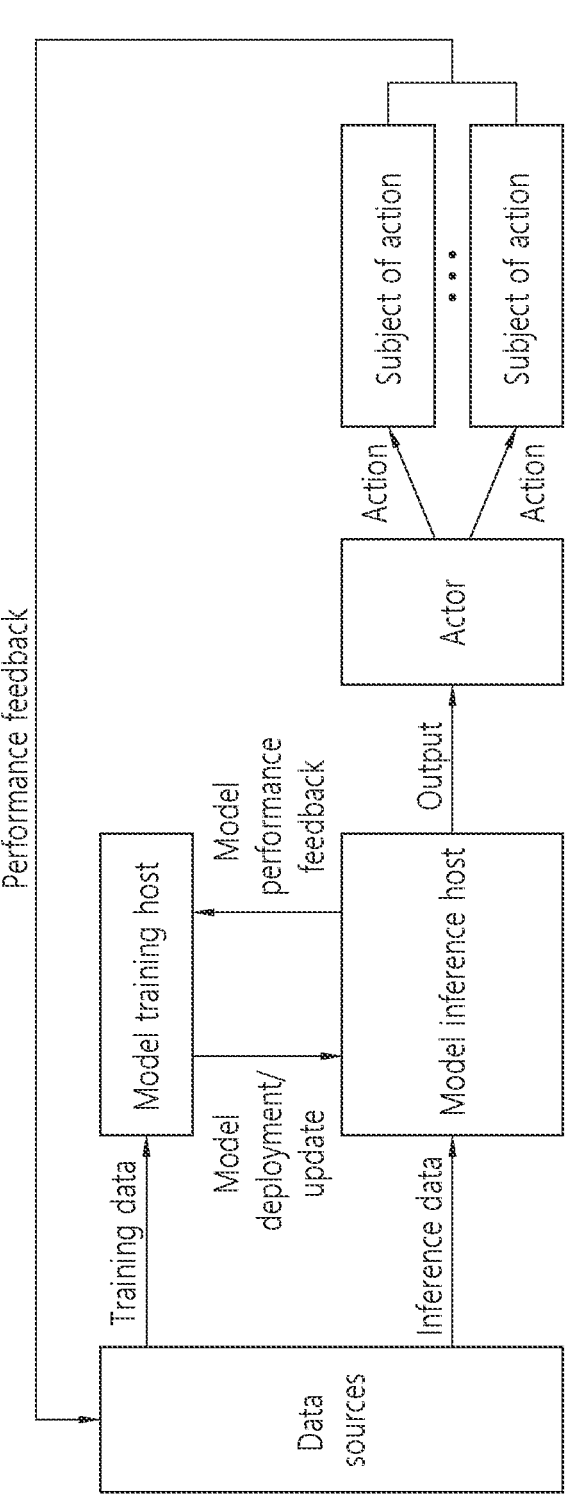
FIG. 9 shows an example of a functional framework for RAN Intelligence to which implementations of the present disclosure is applied.

FIG. 9 shows an example of a functional framework for RAN Intelligence to which implementations of the present disclosure is applied.

Referring to FIG. 9, a model training host may receive, from a data sources, training data. The model training host may provide, to a model inference host, model deployment and/or update. The model training host may receive, from the model inference host, model performance feedback.

The model inference host may receive, from data sources, inference data and transmit, to an actor, output.

The actor may transmit, to one or more subjects of action, an action.

The data sources may receive, from the one or more subjects of action, performance feedback.

For example, the actor and subject of action could be in one box or separate.

For example, the feedback from action to Model training host may be needed.

For example, the feedback from subject of action to the data sources may be Performance feedback or Model performance feedback and other possible refinement.

Meanwhile, in Universal Terrestrial Radio Access Network UTRAN and Evolved-UTRAN (E-UTRAN), Quality of Experience (QoE) Measurement Collection for streaming services have been specified. NR is designed for different kinds of services and scenarios, and operators have strong demand to optimize their network and provide better user experiences with various types of services.

QoE management in 5G will not just collect the experience parameters of streaming services but also consider the typical performance requirements of diverse services (for example, AR/VR and URLLC). Based on requirements of services, adaptive QoE management schemes that enable network intelligent optimization to satisfy user experience for diverse services are studied.

5G network will provide service for various kinds of vertical industries and various kinds of users, the 5QI service requirements may not enough to provide good user experience for all the user requirements. Thus in the 5G network, RAN also needs to collect the user KPI information, for example, E2E reliability statistic indicator, etc.

Different types of UEs have different QE requirements, resource allocation should be based on the UE's requirements. QoE parameters can be defined as UE-specific and service related. In addition, QoE can be used as a criteria to evaluate network quality.

During NR QoE S1 phase, it needs to study the generic mechanisms of trigger, configuration and reporting for QoE measurement collection, including all relevant entities (for example, UE, network entities). In addition, the mechanisms need to support 5G existing services as well as scalable support for new emerging services in the future.

As described above, in 5G network, RAN node needs to support adaptive QoE management mechanism for the various services. Conventional solution for RAN node is to check that some services can be fulfilled or not based on the limited RAN aware parameters. However, this may not be good for the whole system. For example, the current situation may not apply for the future.

Therefore, studies for performing QoE management based on AI model in a wireless communication system are needed.

Hereinafter, a method for performing QoE management based on AI model in a wireless communication system, according to some embodiments of the present disclosure, will be described.

FIG. 10 shows an example of a method for performing QoE management based on AI model in a wireless communication system, according to some embodiments of the present disclosure.

In particular, FIG. 10 shows an example of a method performed by a Radio Access Network (RAN) node in a wireless communication system.

In step S1001, the RAN node may transmit a Quality of Experience (QoE) configuration including one or more of QoE parameters.

For example, the QoE parameters may include at least one of (1) Corruption Duration, (2) Jitter duration, (3) Round-trip time, (4) Re-buffering duration, (5) initial buffering duration, (6) content access/switch time, (7) average throughput, (8) buffer level, (9) play list, and/or (10) playout delay.

For example, (1) the Corruption Duration, (2) the Jitter duration, and/or (3) Round-trip time may be for Multimedia Telephony Service for IP Multimedia Subsystem (IMS) (MTSI) service.

For example, (1) the Corruption Duration, (2) the Jitter duration, (4) the Re-buffering duration, (5) the Initial buffering duration, and/or (6) the content access/switch time may be for Multimedia Broadcast/Multicast Service (MBMS) service.

For example, (7) the average throughput, (8) the buffer level, (9) the play list, and/or (10) playout delay may be for Dynamic Adaptive Streaming over Hypertext Transfer Protocol (HTTP) (DASH) service and/or Virtual Reality (VR) service.

In step S1002, the RAN node may receive a QoE report for the one or more of QoE parameters.

For example, the QoE report includes measurement results for the one or more of QoE parameters.

For example, the UE may include an AI function. In this case, the QoE report further may include outputs of the AI function. For example, the outputs of the AI function may include one or more predicted values for the one or more of QoE parameters. For example, the one or more predicted values may be generated by an AI function of the UE.

In step S1003, the RAN node may train an AI model using the one or more QoE parameters as inputs.

For example, input of the AI model may be the one or more of QoE parameters included in the QoE report.

For example, outputs of the AI model may be one or more predicted values corresponding to the one or more of QoE parameters included in the QoE report.

In step S1004, based on the trained AI model, the RAN node may (1) adjusting resource allocation for a UE on a specific service and/or a specific slice, (2) deciding whether to handover or offload a UE and/or a QoE service to another RAN node, and/or (3) deciding whether to perform slice adjustment for a specific service.

For example, (1) the adjusting resource allocation, (2) the deciding whether to handover or offload a UE and/or a QoE service, and/or (3) the deciding whether to perform slice adjustment may be based on the one or more predicted values.

According to some embodiments of the present disclosure a server, an Operations, Administration and Maintenance (OAM), a next generation (NG)-RAN node, and/or a control unit (CU) may include an AI function for training.

In this case, the RAN node may transmit or forward, to the server, the OAM, the NG-RAN node, and/or the CU, the QoE report for the one or more of QoE parameters.

Then, the RAN node may receive, from the server, the OAM, the NG-RAN node, and/or the CU, outputs of the AI function. The output may include one or more predicted values corresponding to the one or more of QoE parameters included in the QoE report.

According to some embodiments of the present disclosure, the specific UE may be in communication with at least one of a user equipment, a network, or an autonomous vehicle other than the specific UE.

Figure 11:
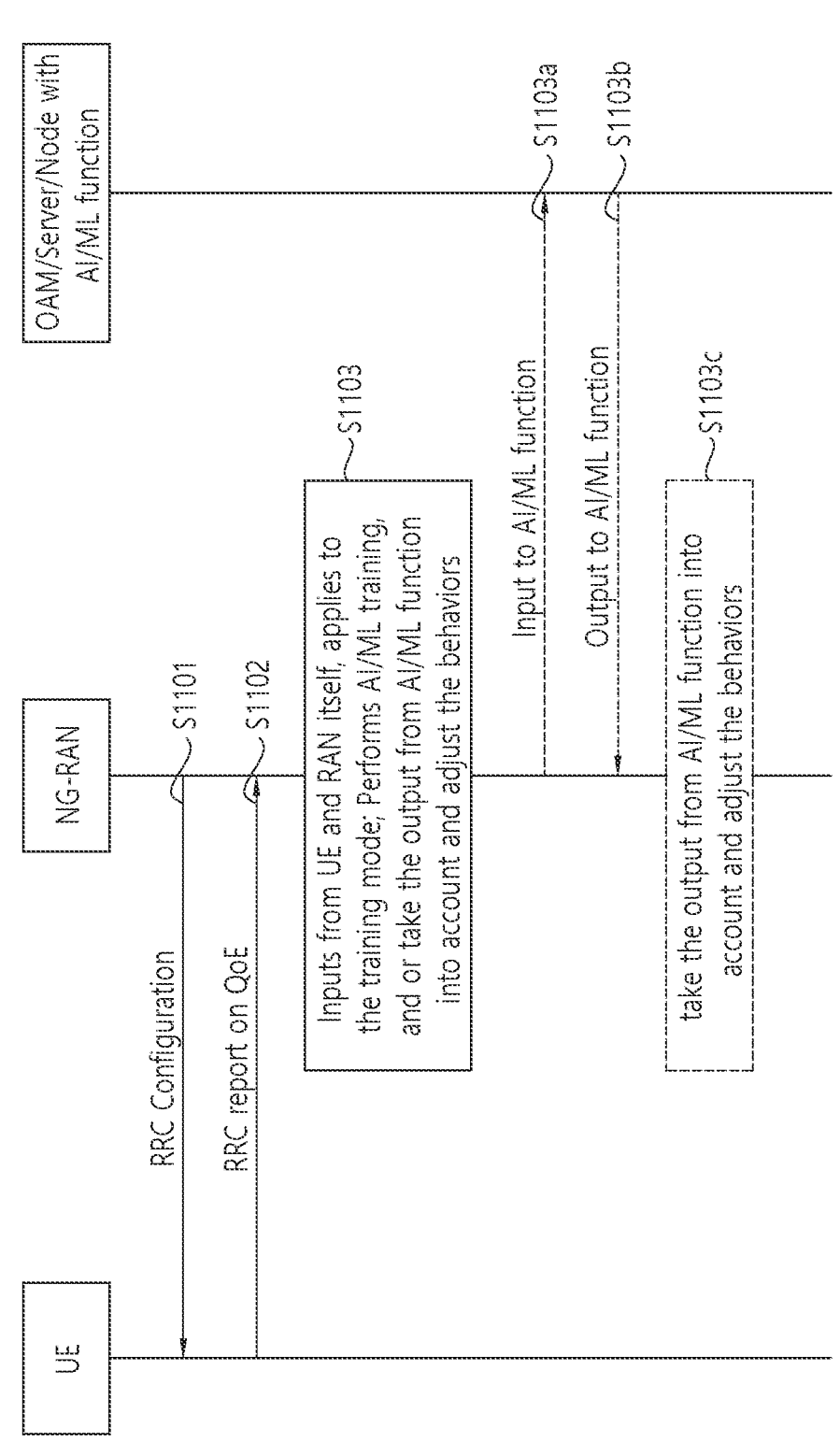
FIG. 11 shows an example of a method for an AI based QoE management in a wireless communication system.

FIG. 11 shows an example of a method for an AI based QoE management in a wireless communication system.

In step S1101, an NG-RAN node may send the RAN-visible QoE configuration to a UE.

The QoE configuration may include indication of notifying UE to report on the UE based AI/ML training model, UE's training results on the following QoE parameters (the measurement can be performed on the specific service, or specific network slice):

Corruption Duration
Jitter duration
Round-trip time
Re-buffering duration
Initial buffering duration
Content Access/Switch Time
Average Throughput
Buffer level
Play List
Playout delay For example, Corruption Duration, Jitter duration, and/or Round-trip time could be used for MTSI (Multimedia Telephony Service for IMS) service. For example, Corruption Duration, Jitter duration, Re-buffering duration, Initial buffering duration, and/or Content Access/Switch Time could be used for MBMB service. For example, Average Throughput, Buffer level, Play List, and/or Playout delay could be used for DASH and VR service. However, the present disclosure is not limited thereto. For example, the above parameters could be used for other services.

Alternatively, an NG-RAN may notify UE to report the following measurement results of QoE for the following parameters based on the specific service or specific network slice:

Corruption Duration,
Jitter duration
Round-trip time
Re-buffering duration
Initial buffering duration
Content Access/Switch Time
Average Throughput
Buffer level
Play List
Playout delay For example, Corruption Duration, Jitter duration, and/or Round-trip time can be measured for MTSI (Multimedia Telephony Service for IMS) service. For example, Corruption Duration, Jitter duration, Re-buffering duration, Initial buffering duration, and/or Content Access/Switch Time can be measured for MBMB service. For example, Average Throughput, Buffer level, Play List, and/or Playout delay can be measured for DASH and VR service. However, the present disclosure is not limited thereto. For example, the above parameters could be used for other services.

In step S1102, the UE may receive and perform the RAN-visible QoE configuration/measurement.

The measurement report on the QoE parameters requested in step S1101 above may be provided from the application layer of the UE to the RRC layer of the UE by means of an AT command.

The UE's RRC layer then may include the report of the requested parameters in step S1101, and send them to the RAN. The measurement results can be on the specific service and or on specific network slice.

If UE has the AI/ML training model on QoE services/parameters, the measurement report of UE application layer may be the input for UE on training. The training model and the UE's training results on the requested QoE parameters in step S1101 (the measurement can be on the specific service, or specific network slice) may be included and sent to the NG-RAN.

In step S1103, if NG-RAN has an AI/ML training function, the received UE based AI/ML training model and/or UE's training results on the QoE parameters will be the input to the AI/ML training model.

On the other hand, the QoE report (can be based on the specific service, or specific network slice) from UE on the following parameters will be the direct input to AI/ML training model in NG-RAN:

Corruption Duration,
Jitter duration
Round-trip time
Re-buffering duration
Initial buffering duration
Content Access/Switch Time
Average Throughput
Buffer level
Play List
Playout delay For example, Corruption Duration, Jitter duration, and/or Round-trip time could be for MTSI (Multimedia Telephony Service for IMS) service. For example, Corruption Duration, Jitter duration, Re-buffering duration, Initial buffering duration, and/or Content Access/Switch Time could be for MBMB service. For example, Average Throughput, Buffer level, Play List, and/or Playout delay could be for DASH and VR service. However, the present disclosure is not limited thereto. For example, the above parameters could be used for other services.

The NG-RAN node may take (1) the inputs from UE and (2) the information from the UE into account. The NG-RAN node may apply the data (for example, the outputs of the AI/ML function can be the predicated average throughput, round trip time, buffer level, and/or jitter duration (for example, at least one parameter among the all parameters in step S1101 and S1102 can be applied)) to the AI/ML function for training to predicate QoE service in the long term or short term.

The output from AI function will be used for:

Adjusting the resource allocation for a UE on a specific service and specific slice deciding whether to handover or offload the UE or the QoE service to another node, or offload the UE or the QoE service to a secondary node (1) in case that it judges/predicates that it seems to be overloaded in the following time period and/or (2) based on the predicated average throughput, round trip time, buffer level, and/or jitter duration (for example, based on the at least one parameter among the all parameters in step S1101 and/or S1102)

deciding whether to perform the slice adjustment for a specific service based on the predicated average throughput, round trip time, buffer level, and/or jitter duration (for example, based on at least one parameter among the all parameters in step S1101 and/or S1102).

In step S1103a, if NG-RAN does not has a AI/ML training function, the NG-RAN may forward the received UE based AI/ML training model and/or UE's training results on the QoE parameters to the server, OAM, and/or a node near the NG-RAN, which has the AI/ML training function.

The server, OAM, and/or a node near the NG-RAN may use the received data as the input for the AI/ML training function.

On the other hand, the QoE report (for example, the QoE report can be based on the specific service, or specific network slice) from UE on the following parameters will be passed to the server, OAM, and/or a node near NG-RAN, which has the AI/ML training function, as the direct input to AI/ML training function:

Corruption Duration,
Jitter duration
Round-trip time
Re-buffering duration,
Initial buffering duration,
Content Access/Switch Time
Average Throughput
Buffer level
Play List
Playout delay For example, Corruption Duration. Jitter duration, and/or Round-trip time can be for MTSI (Multimedia Telephony Service for IMS) service. For example, Corruption Duration, Jitter duration, Re-buffering duration, Initial buffering duration, and/or Content Access/Switch Time can be for MBMB service. For example, Average Throughput, Buffer level, Play List, and/or Playout delay can be for DASH and VR service. However, the present disclosure is not limited thereto. For example, the above parameters could be used for other services.

The server, OAM, and/or a node near NG-RAN may take the inputs from UE and the information from the UE into account. The server, OAM, and/or a node near NG-RAN may apply the data to the AI/ML function for training to predicate QoE service in the long term or short term.

In step S1103b, the outputs of AI/ML function will be sent to NG-RAN node. For example, the predicated information could be the predicated average throughput/round trip time/ buffer level/jitter duration (for example, at least one parameter among the all parameters in step S1101 or S1102).

In step S1103b, based on the predicated information, the NG-RAN node will:

adjust the resource allocation for a UE on a specific service and specific slice decide whether to handover the UE or the QoE service to another node, or offload the UE or the QoE service to a secondary node (1) in case that it judges/predicates that it seems to be overloaded in the following time period or (2) based on the predicated average through-put/round trip time/buffer level/jitter duration (for example, based on at least one parameter among that all parameters in step S1101 or S1102), decide whether to perform the slice adjustment for a specific service based on the predicated average throughput, round trip time, buffer level, and/or jitter duration (for example, based on at least one parameter among the all parameters in step S1101 and/or S1102).

Herein, all the messages above are examples by using the existing procedures, but they are not limited. That is, new messages can be defined to realize the same goal.

Some of the detailed steps shown in the example of FIGS. 10 and 11 may not be essential steps and may be omitted. In addition, steps other than the steps shown in FIGS. 10 and 11 may be added, and the order of the steps may vary. Some of the above steps may have their own technical meaning.

Hereinafter, an apparatus for performing QoE management based on AI model in a wireless communication system, according to some embodiments of the present disclosure, will be described.

For example, a Random Access Network (RAN) node may include a processor, and a memory. The processor may be configured to be coupled operably with the memory.

The processor may be configured to transmit a Quality of Experience (QoE) configuration including one or more of QoE parameters. The processor may be configured to receive a QoE report for the one or more of QoE parameters. The processor may be configured to train an AI model using the one or more QoE parameters as inputs. Based on the trained AI model, the processor may be configured to (1) adjust resource allocation for a UE on a specific service and/or a specific slice, (2) decide whether to handover a UE and/or a QoE service to another RAN node, and/or (3) decide whether to perform slice adjustment for a specific service.

For example, outputs of the AI model may be one or more predicted values corresponding to the one or more of QoE parameters included in the QoE report. For example, (1) the adjusting resource allocation, (2) the deciding whether to handover or offload a UE and/or a QoE service, and/or (3) the deciding whether to perform slice adjustment may be based on the one or more predicted values.

For example, the QoE report may include measurement results for the one or more of QoE parameters. In addition, the QoE report may further include one or more predicted values for the one or more of QoE parameters. The one or more predicted values may be generated by an AI function of the UE.

For example, the QoE parameters may include at least one of (1) Corruption Duration, (2) Jitter duration, (3) Round-trip time, (4) Re-buffering duration, (5) initial buffering duration, (6) content access/switch time, (7) average throughput, (8) buffer level, (9) play list, and/or (10) playout delay.

For example, (1) the Corruption Duration, (2) the Jitter duration, and/or (3) Round-trip time may be for Multimedia Telephony Service for IP Multimedia Subsystem (IMS) (MTSI) service.

For example, (1) the Corruption Duration, (2) the Jitter duration, (4) the Re-buffering duration, (5) the Initial buffering duration, and/or (6) the content access/switch time may be for Multimedia Broadcast/Multicast Service (MBMS) service.

For example, (7) the average throughput, (8) the buffer level, (9) the play list, and/or (10) playout delay may be for Dynamic Adaptive Streaming over Hypertext Transfer Protocol (HTTP) (DASH) service and/or Virtual Reality (VR) service.

According to some embodiments of the present disclosure, the processor may be configured to transmit, to a server, an Operations, Administration and Maintenance (OAM), and/or a next generation (NG)-RAN node, the QoE report for the one or more of QoE parameters. The server, the OAM, and/or the NG-RAN node/CU may include an AI function for training.

The processor may be configured to receive, from the server, the OAM, and/or the NG-RAN node/CU, outputs of the AI function. For example, the output may include one or more predicted values corresponding to the one or more of QoE parameters included in the QoE report.

According to some embodiments of the present disclosure, the UE may be in communication with at least one of a user equipment, a network, or an autonomous vehicle other than the UE.

Hereinafter, a processor for a Random Access Network (RAN) node for performing QoE management based on AI model in a wireless communication system, according to some embodiments of the present disclosure, will be described.

The processor may be configured to control the RAN node to transmit a Quality of Experience (QoE) configuration including one or more of QoE parameters. The processor may be configured to control the RAN node to receive a QoE report for the one or more of QoE parameters. The processor may be configured to control the RAN node to train an AI model using the one or more QoE parameters as inputs. Based on the trained AI model, the processor may be configured to control the RAN node to (1) adjust resource allocation for a UE on a specific service and/or a specific slice. (2) decide whether to handover a UE and/or a QoE service to another RAN node, and/or (3) decide whether to perform slice adjustment for a specific service.

For example, outputs of the AI model may be one or more predicted values corresponding to the one or more of QoE parameters included in the QoE report. For example, (1) the adjusting resource allocation, (2) the deciding whether to handover or offload a UE and/or a QoE service, and/or (3) the deciding whether to perform slice adjustment may be based on the one or more predicted values.

For example, the QoE report may include measurement results for the one or more of QoE parameters. In addition, the QoE report may further include one or more predicted values for the one or more of QoE parameters. The one or more predicted values may be generated by an AI function of the UE.

For example, the QoE parameters may include at least one of (1) Corruption Duration, (2) Jitter duration, (3) Round-trip time, (4) Re-buffering duration, (5) initial buffering duration, (6) content access/switch time, (7) average throughput, (8) buffer level, (9) play list, and/or (10) playout delay.

For example, (1) the Corruption Duration, (2) the Jitter duration, and/or (3) Round-trip time may be for Multimedia Telephony Service for IP Multimedia Subsystem (IMS) (MTSI) service.

For example, (1) the Corruption Duration, (2) the Jitter duration, (4) the Re-buffering duration, (5) the Initial buffering duration, and/or (6) the content access/switch time may be for Multimedia Broadcast/Multicast Service (MBMS) service.

For example, (7) the average throughput, (8) the buffer level, (9) the play list, and/or (10) playout delay may be for Dynamic Adaptive Streaming over Hypertext Transfer Protocol (HTTP) (DASH) service and/or Virtual Reality (VR) service.

According to some embodiments of the present disclosure, the processor may be configured to control the RAN node to transmit, to a server, an Operations, Administration and Maintenance (OAM), and/or a next generation (NG)-RAN node, the QoE report for the one or more of QoE parameters. The server, the OAM, and/or the NG-RAN node/CU may include an AI function for training.

The processor may be configured to control the RAN node to receive, from the server, the OAM, and/or the NG-RAN node/CU, outputs of the AI function. For example, the output may include one or more predicted values corresponding to the one or more of QoE parameters included in the QoE report.

According to some embodiments of the present disclosure, the UE may be in communication with at least one of a user equipment, a network, or an autonomous vehicle other than the UE.

Hereinafter, a non-transitory computer-readable medium has stored thereon a plurality of instructions for performing QoE management based on AI model in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM). FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a Random Access Network (RAN) node.

The stored a plurality of instructions may cause the RAN node to transmit a Quality of Experience (QoE) configuration including one or more of QoE parameters. The stored a plurality of instructions may cause the RAN node to receive a QoE report for the one or more of QoE parameters. The stored a plurality of instructions may cause the RAN node to train an AI model using the one or more QoE parameters as inputs. Based on the trained AI model, the stored a plurality of instructions may cause the RAN node to (1) adjust resource allocation for a UE on a specific service and/or a specific slice, (2) decide whether to handover a UE and/or a QoE service to another RAN node, and/or (3) decide whether to perform slice adjustment for a specific service.

For example, outputs of the AI model may be one or more predicted values corresponding to the one or more of QoE parameters included in the QoE report. For example, (1) the adjusting resource allocation, (2) the deciding whether to handover or offload a UE and/or a QoE service, and/or (3) the deciding whether to perform slice adjustment may be based on the one or more predicted values.

For example, the QoE report may include measurement results for the one or more of QoE parameters. In addition, the QoE report may further include one or more predicted values for the one or more of QoE parameters. The one or more predicted values may be generated by an AI function of the UE.

For example, the QoE parameters may include at least one of (1) Corruption Duration, (2) Jitter duration, (3) Round-trip time, (4) Re-buffering duration, (5) initial buffering duration, (6) content access/switch time, (7) average throughput, (8) buffer level, (9) play list, and/or (10) playout delay.

For example, (1) the Corruption Duration, (2) the Jitter duration, and/or (3) Round-trip time may be for Multimedia Telephony Service for IP Multimedia Subsystem (IMS) (MTSI) service.

For example, (1) the Corruption Duration, (2) the Jitter duration, (4) the Re-buffering duration, (5) the Initial buffering duration, and/or (6) the content access/switch time may be for Multimedia Broadcast/Multicast Service (MBMS) service.

For example, (7) the average throughput. (8) the buffer level, (9) the play list, and/or (10) playout delay may be for Dynamic Adaptive Streaming over Hypertext Transfer Protocol (HTTP) (DASH) service and/or Virtual Reality (VR) service.

According to some embodiments of the present disclosure, the stored a plurality of instructions may cause the RAN node to transmit, to a server, an Operations. Administration and Maintenance (OAM), a next generation (NG)-RAN node and/or a control unit (CU), the QoE report for the one or more of QoE parameters. The server, the OAM, the NG-RAN node, and/or the CU may include an AI function for training.

The stored a plurality of instructions may cause the RAN node to receive, from the server, the OAM, the NG-RAN node, and/or the CU, outputs of the AI function. For example, the output may include one or more predicted values corresponding to the one or more of QoE parameters included in the QoE report.

According to some embodiments of the present disclosure, the UE may be in communication with at least one of a user equipment, a network, or an autonomous vehicle other than the UE.

The present disclosure may have various advantageous effects.

According to some embodiments of the present disclosure, a RAN node could perform QoE management efficiently by using an AI function.

For example, a RAN node could predicate the situation in the future and make a decision for UE(s) on a better resource allocation solution for a specific service.

For example, a RAN node could predicate the situation in the future. Thus, a RAN node could make a decision for UE(s) on a better resource allocation solution for a specific service, handover/offloading a specific service/UE to other node. In addition, a RAN node could perform slice based adjustment.

According to some embodiments of the present disclosure, the QoE of a UE could be enhanced from RAN point of view.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

The invention claimed is:

1. A method, comprising, transmitting, by a radio access network node to a wireless device, a message including information related to a quality of experience configuration, wherein the information related to a quality of experience configuration includes at least one quality of experience parameter, wherein the at least one quality of experience parameter includes at least one of i) corruption duration, ii) jitter duration, iii) round-trip time, iv) re-buffering duration, v) initial buffering duration, vi) content access or switch time, vii) average throughput, viii) buffer level, ix) play list, and/or x) playout delay;

receiving, by the radio access network node from the wireless device, a quality of experience report, wherein the quality of experience report includes measurement results related to the at least one quality of experience parameter;

training, by the radio access network node, an artificial intelligence model based on the measurement results related to the at least one quality of experience parameter;

deriving, by the radio access network node, at least one predicted value corresponding to the at least one quality of experience parameter; and adjusting, by the radio access network node, resource allocation related to the wireless device using a specific slice by offloading the wireless device to a secondary radio access network node, based on the at least one predicted value.

2. The method of claim 1, wherein the quality of experience report further includes one or more predicted values related to at least one quality of experience parameter, wherein the one or more predicted values are generated by an artificial intelligence function of the wireless device.

3. The method of claim 1, wherein (1) the corruption duration, (2) the jitter duration, and (3) round-trip time are parameters for Multimedia Telephony Service for IP Multimedia Subsystem (IMS) (MTSI) service.

4. The method of claim 1, wherein (1) the corruption duration, (2) the jitter duration, (4) the re-buffering duration, (5) the initial buffering duration, and (6) the content access/switch time are parameters for Multimedia Broadcast/Multicast Service (MBMS) service.

5. The method of claim 1, wherein (7) the average throughput, (8) the buffer level, (9) the play list, and (10) playout delay are parameters for Dynamic Adaptive Streaming over Hypertext Transfer Protocol (HTTP) (DASH) service and/or Virtual Reality (VR) service.

6. The method of claim 1, wherein the wireless device is in communication with at least one of a user equipment, a network, or an autonomous vehicle other than the wireless device.

7. A radio access network node comprising:

a memory; and at least one processor operatively coupled to the memory, and configured to perform operations, wherein the operations comprising:

transmitting, to a wireless device, a quality of experience configuration including information related to at least one quality of experience parameter, wherein at least one quality of experience parameter includes at least one of i) corruption duration, ii) jitter duration, iii) round-trip time, iv) re-buffering duration, v) initial buffering duration, vi) content access or switch time, vii) average throughput, viii) buffer level, ix) play list, and/or x) playout delay;

receiving, from the wireless device, a quality of experience report including measurement results related to the at least one quality of experience parameter;

training an artificial intelligence model based on the information related to the at least one quality of experience parameter;

deriving at least one predicted value corresponding to the at least one quality of experience parameter based on the trained artificial intelligence model; and adjusting resource allocation related to the wireless device using a specific slice by offloading the wireless device to a secondary random access network node, based on the at least one predicted value.

8. The RAN node of claim 7, wherein the quality of experience report further includes one or more predicted values related to at least one quality of experience parameter, wherein the one or more predicted values are generated by an artificial intelligence function of the wireless device.

* * * * *